(12) United States Patent
Park

(10) Patent No.: US 11,077,828 B2
(45) Date of Patent: Aug. 3, 2021

(54) VEHICLE SMART ENTRY SYSTEM AND METHOD THEREFOR

(71) Applicants: HYUNDAI MOTOR COMPANY, Seoul (KR); KIA MOTORS CORPORATION, Seoul (KR)

(72) Inventor: Min Gu Park, Pocheon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/684,036

(22) Filed: Nov. 14, 2019

(65) Prior Publication Data
US 2021/0001807 A1 Jan. 7, 2021

(30) Foreign Application Priority Data
Jul. 4, 2019 (KR) .................. 10-2019-0080542

(51) Int. Cl.
*B60R 25/24* (2013.01)
*B60R 25/102* (2013.01)
*B60R 25/30* (2013.01)
*H04W 12/122* (2021.01)
*H04W 12/04* (2021.01)
*H04W 12/06* (2021.01)
*G07C 9/00* (2020.01)

(52) U.S. Cl.
CPC ............ *B60R 25/24* (2013.01); *B60R 25/102* (2013.01); *B60R 25/305* (2013.01); *H04W 12/04* (2013.01); *H04W 12/06* (2013.01); *B60R 2325/205* (2013.01); *G07C 2009/00555* (2013.01); *H04W 12/122* (2021.01)

(58) Field of Classification Search
CPC ..... B60R 25/24; B60R 25/102; B60R 25/305; B60R 2325/205; H04W 12/04; H04W 12/06; H04W 4/40; H04W 4/80; H04W 12/122; H04L 9/3297; G07C 2009/00555
See application file for complete search history.

(56) References Cited

U.S. PATENT DOCUMENTS

| 9,842,447 | B2 * | 12/2017 | Badger, II | ......... G07C 9/00571 |
| 9,845,071 | B1 * | 12/2017 | Krishnan | ............... B60R 25/24 |
| 9,905,064 | B2 * | 2/2018 | Ohshima | ........... B62D 15/0285 |
| 9,911,259 | B1 * | 3/2018 | Ghabra | ................ G07C 9/28 |
| 10,068,400 | B2 * | 9/2018 | Gerlach | ............ G07C 9/00309 |
| 10,086,797 | B2 * | 10/2018 | Krishnan | ............... B60R 25/24 |
| 10,235,820 | B2 * | 3/2019 | Bartels | ............... H04W 12/065 |
| 10,252,699 | B2 * | 4/2019 | Schoula | ................. B60R 25/24 |

(Continued)

*Primary Examiner* — Brian E Miller
(74) *Attorney, Agent, or Firm* — Brinks Gilson & Lione

(57) ABSTRACT

A vehicle smart entry system and a method of operating the same may authenticate not only a smart key of a user who attempts to ride in a vehicle, but also a smartphone of the user, thereby improving security. The smart entry system includes a first communication device that communicates with a smart key, a second communication device that communicates with the smart key and a smartphone, and a controller that authenticates a user using a time stamp value received from the smart key through the first communication device, and a time stamp value received from the smart key through the second communication device and a time stamp value received from the smartphone through the second communication device.

14 Claims, 7 Drawing Sheets

(56) References Cited

U.S. PATENT DOCUMENTS

| | | | | |
|---|---|---|---|---|
| 10,266,148 | B2* | 4/2019 | Mohaupt | B60R 25/209 |
| 10,268,190 | B2* | 4/2019 | Chin | B60R 25/24 |
| 10,388,091 | B2* | 8/2019 | Ohshima | G07C 9/28 |
| 10,538,220 | B1* | 1/2020 | Tyagi | B60R 25/24 |
| 10,569,739 | B2* | 2/2020 | Pudar | G07C 9/00571 |
| 10,732,622 | B2* | 8/2020 | Bettger | B60W 30/06 |
| 10,831,859 | B2* | 11/2020 | Van Wiemeersch | G06Q 10/06 |
| 2009/0006032 | A1* | 1/2009 | Wilcox | G07C 9/00309 |
| | | | | 702/176 |
| 2011/0257817 | A1* | 10/2011 | Tieman | G07C 9/00309 |
| | | | | 701/2 |
| 2014/0330449 | A1* | 11/2014 | Oman | B60R 25/01 |
| | | | | 701/2 |
| 2015/0120151 | A1* | 4/2015 | Akay | B60R 25/24 |
| | | | | 701/49 |
| 2015/0149042 | A1* | 5/2015 | Cooper | H04W 4/48 |
| | | | | 701/48 |
| 2016/0055699 | A1* | 2/2016 | Vincenti | H04W 12/04 |
| | | | | 340/5.61 |
| 2016/0144857 | A1* | 5/2016 | Ohshima | G08G 1/04 |
| | | | | 701/23 |
| 2016/0150407 | A1* | 5/2016 | Michaud | H04L 63/0876 |
| | | | | 726/6 |
| 2016/0203661 | A1* | 7/2016 | Pudar | G07C 9/00571 |
| | | | | 340/5.25 |
| 2017/0092030 | A1* | 3/2017 | Badger, II | G07C 9/00571 |
| 2017/0134382 | A1* | 5/2017 | Darnell | H04W 12/041 |
| 2017/0178035 | A1* | 6/2017 | Grimm | G06Q 30/0645 |
| 2017/0232933 | A1* | 8/2017 | Nishidai | B60R 25/24 |
| | | | | 340/5.61 |
| 2017/0282859 | A1* | 10/2017 | Grimm | H04L 9/0891 |
| 2017/0349142 | A1* | 12/2017 | Krishnan | G07C 9/0069 |
| 2017/0349146 | A1* | 12/2017 | Krishnan | B60R 25/241 |
| 2018/0099643 | A1* | 4/2018 | Golsch | B60R 25/2018 |
| 2018/0186332 | A1* | 7/2018 | Bocca | H04W 12/08 |
| 2018/0314314 | A1* | 11/2018 | Link, II | G06F 1/3209 |
| 2018/0370488 | A1* | 12/2018 | Schoula | G07C 9/00896 |
| 2018/0374290 | A1* | 12/2018 | Bjorkengren | B60R 25/24 |
| 2019/0044951 | A1* | 2/2019 | Zivkovic | H04W 12/08 |
| 2019/0241154 | A1* | 8/2019 | Elangovan | H04W 48/04 |
| 2019/0268169 | A1* | 8/2019 | Castillo | H04L 9/0861 |
| 2019/0347882 | A1* | 11/2019 | Salah | H04L 9/06 |
| 2020/0120509 | A1* | 4/2020 | Stitt | H04B 17/318 |
| 2020/0128401 | A1* | 4/2020 | Shin | H04L 63/062 |
| 2020/0148168 | A1* | 5/2020 | DeLong | B60R 25/24 |
| 2020/0225657 | A1* | 7/2020 | Bettger | B62D 1/00 |
| 2020/0276959 | A1* | 9/2020 | Cho | B60R 25/04 |
| 2020/0304527 | A1* | 9/2020 | Santavicca | H04L 9/002 |
| 2021/0001807 | A1* | 1/2021 | Park | H04W 12/06 |
| 2021/0016743 | A1* | 1/2021 | Kusumoto | G01S 13/76 |

* cited by examiner

VEHICLE SMART ENTRY SYSTEM AND METHOD THEREFOR

CROSS-REFERENCE TO RELATED APPLICATION

This application claims priority to and the benefit of Korean Patent Application No. 10-2019-0080542, filed on Jul. 4, 2019, the entire contents of which are incorporated herein by reference.

FIELD

The present disclosure relates to a technique for accurately verifying authority of a user attempting to ride a vehicle.

BACKGROUND

The statements in this section merely provide background information related to the present disclosure and may not constitute prior art.

In general, a smart key system performs a process of determining whether a smart key possessed by a driver is a valid key when the driver possessing the smart key approaches his vehicle and approaches an immobilizer unit mounted on the vehicle, and when the smart key is the valid key, the smart key system allows the immobilizer unit to perform a smart key function.

When a smart key function is performed in a vehicle employing the smart key system, a driver with a valid smart key may approach the vehicle and open a door or trunk of the vehicle without any manual operation, and start the vehicle with a simple touch instead of manual start at the time of driving.

Recently, a digital key system has been developed to enable a smart key function to be performed using a smartphone or a Near Field Communication (NFC) card.

However, we have discovered that such a conventional entry system has a problem of low security because it authenticates only a smart key or only a smartphone.

SUMMARY

The present disclosure has been made to solve the above-mentioned problems occurring in the prior art while advantages achieved by the prior art are maintained intact.

An aspect of the present disclosure provides a vehicle smart entry system and a method of operating the same, capable of authenticating not only a smart key of a user who attempts to ride in a vehicle, but also a smartphone of the user, thereby improving security of the vehicle.

The objects of the present disclosure are not limited to the above-mentioned objects, and other objects and advantages of the present disclosure which are not mentioned may be understood by the following description, and will be more clearly understood by exemplary forms of the present disclosure. It will also be readily apparent that the objects and advantages of the disclosure may be realized by means of the instrumentalities and combinations particularly pointed out in the appended claims.

The technical problems to be solved by the present inventive concept are not limited to the aforementioned problems, and any other technical problems not mentioned herein will be clearly understood from the following description by those skilled in the art to which the present disclosure pertains.

According to a first aspect of the present disclosure, a vehicle smart entry system includes: a first communication device that communicates with a smart key, a second communication device that communicates with the smart key and a smartphone, and a controller that authenticates a user using a first time stamp value received from the smart key through the first communication device, and a second time stamp value received from the smart key through the second communication device and a third time stamp value received from the smartphone through the second communication device.

A period at which the first communication device communicates with the smart key may be identical to a period at which the second communication device communicates with the smart key and the smartphone.

The first communication device may insert a time stamp into a Low Frequency (LF) frame and transmit the LF frame to the smart key and receives a time stamp value of the LF frame received from the smart key.

The second communication device may insert a time stamp into a short-range communication frame and transmit the short-range communication frame to the smart key and the smartphone, receive a time stamp value of the short-range communication frame received from the smart key, and receive the time stamp value of the short-range communication frame received from the smartphone.

The controller may authenticate the user as normal when the first time stamp value received through the first communication device, the second time stamp value received from the smart key through the second communication device, and the third time stamp value received from the smartphone through the second communication device are identical to one another.

The controller may authenticate the user as normal when the first time stamp value received through the first communication device and the second time stamp value received from the smart key through the second communication device are identical to each other.

The controller may activate a Drive Video Record System (DVRS) and transmit a warning message to a vehicle owner's smartphone when the first time stamp value received through the first communication device and the second time stamp value received from the smart key through the second communication device are not identical to each other.

According to a first aspect of the present disclosure, a method of operating a vehicle smart entry system may include: communicating, by a first communication device, with a smart key; communicating, by a second communication device, with the smart key and a smartphone; and authenticating, by a controller, a user using a first time stamp value received from the smart key through the first communication device, and a second time stamp value received from the smart key through the second communication device and a third time stamp value received from the smartphone through the second communication device.

A period at which the first communication device communicates with the smart key may be identical to a period at which the second communication device communicates with the smart key and the smartphone.

The communicating, by the first communication device, with the smart key may include: inserting a time stamp into a Low Frequency (LF) frame and transmitting the LF frame to the smart key, and receiving a time stamp value of the LF frame received from the smart key.

The communicating, by the second communication device, with the smart key and the smartphone may include:

inserting a time stamp into a short-range communication frame and transmitting the short-range communication frame to the smart key and the smartphone, receiving a time stamp value of the short-range communication frame received from the smart key, and receiving the time stamp value of the short-range communication frame received from the smartphone.

The authenticating of the user may include: authenticating the user as normal when the first time stamp value received through the first communication device, the second time stamp value received from the smart key through the second communication device, and the third time stamp value received from the smartphone through the second communication device are identical to one another.

The authenticating of the user may include: authenticating the user as normal when the first time stamp value received through the first communication device and the second time stamp value received from the smart key through the second communication device are identical to each other.

The authenticating of the user may include: activating a Drive Video Record System (DVRS) and transmitting a warning message to a vehicle owner's smartphone when the first time stamp value received through the first communication device and the second time stamp value received from the smart key through the second communication device are not identical to each other.

According to a second aspect of the present disclosure, a vehicle smart entry system includes: a first communication device that communicates with a smart key, a second communication device that communicates with a smartphone, and a controller that authenticates the smart key based on authentication information received through the first communication device and authenticates the smartphone based on authentication information received through the second communication device.

The controller may activate the first communication device and the second communication device when a door handle button of a vehicle is pressed by a user.

The controller may activate a Drive Video Record System (DVRS) and transmit a warning message to a vehicle owner's smartphone when authentication for the smart key succeeds but authentication for the smartphone fails.

According to a second aspect of the present disclosure, a method of operating a vehicle smart entry system includes: communicating, by a first communication device, with a smart key, communicating, by a second communication device, with a smartphone, and authenticating, by a controller, the smart key based on authentication information received through the first communication device and authenticating the smartphone based on authentication information received through the second communication device.

The authenticating of the smart key and the smartphone may include activating, by the controller, the first communication device and the second communication device when a door handle button of a vehicle is pressed by a user.

The authenticating of the smart key and the smartphone may include activating a Drive Video Record System (DVRS) and transmitting a warning message to a vehicle owner's smartphone when authentication for the smart key succeeds but authentication for the smartphone fails.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
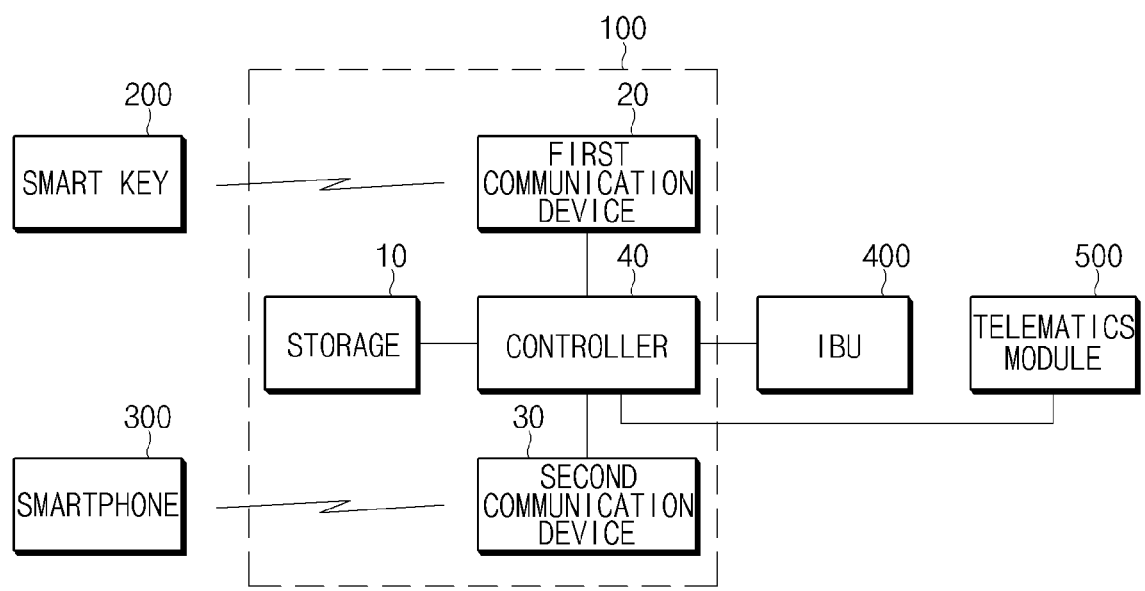
FIG. 1 is a configuration diagram of a vehicle smart entry system in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing the form of the present disclosure, a detailed description of well-known features or functions will be ruled out in order not to unnecessarily obscure the gist of the present disclosure.

In describing the components of the form according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a configuration diagram of a vehicle smart entry system in one form of the present disclosure.

Referring to FIG. 1, the vehicle smart entry system 100 may include: storage 10, a first communication device 20, a second communication device 30, and a controller 40.

According to a method of implementing the vehicle smart entry system 100 according to one form of the present disclosure, components may be combined with each other as a single component, or some components may be omitted.

Hereinafter, a first form (not equipped with a short-range communication module) and a second form (equipped with a short-range communication module) will be described separately depending on whether a short-range communication module is additionally mounted, in a state in which an LF/RF communication module is mounted on a smart key 200 that communicates with the first communication device 20.

First Form

With respect to each of the components, first, the storage 10 may store logics, algorithms and programs desired in a process of authenticating a smart key and a smartphone of a user attempting to ride in a vehicle.

Information on the smart key 200 granted permission to use the vehicle and information on a smartphone 300 may be stored.

The storage 10 may include at least one type of storage medium of a memory such as a flash memory type, a hard disk type, a micro type, and a card type (e.g., an Secure Digital (SD) card or an eXtream Digital (XD) card), and a memory such as a RAM (Random Access Memory), an SRAM (Static RAM), a ROM (Read-Only Memory), a PROM (Programmable ROM), an EEPROM (Electrically Erasable PROM), a Magnetic Memory (MRAM), a magnetic disk, and an optical disk type.

The first communication device 20 may be activated by the controller 40 to communicate with the smart key 200. That is, the first communication device 20 may request authentication information from the smart key 200 in a low frequency (LF) communication method, and receive the authentication information from the smart key 200 in a radio frequency (RF) communication method. In this case, the authentication information may include a vehicle unique number or the like.

The second communication device 30 may be activated by the controller 40 to communicate with the smartphone 300 in a short range communication method. That is, the second communication device 30 may request authentication information from the smartphone 300 and receive the authentication information from the smartphone 300. In this case, the authentication information may include a smartphone unique number, a user's social security number, or the like.

Here, short range communication includes Bluetooth™, Radio Frequency Identification (RFID), Infrared Data Association (IrDA), Ultra WideBand (UWB), ZigBee, Near Field Communication (NFC), Wireless-Fidelity (Wi-Fi), Wi-Fi Direct, and Wireless USB (Wireless Universal Serial Bus).

The controller 40 may perform overall control such that each of the above components normally performs its function. The controller 40 may be implemented in the form of hardware or software, or may be implemented in a combination of hardware and software. In one form, the controller 40 may be implemented with a microprocessor, but is not limited thereto.

The controller 40 may perform various control desired in the process of authenticating the smart key and the smartphone of the user attempting to ride the vehicle.

Hereinafter, the operation of the controller 40 will be described with reference to FIG. 2.

Figure 2:
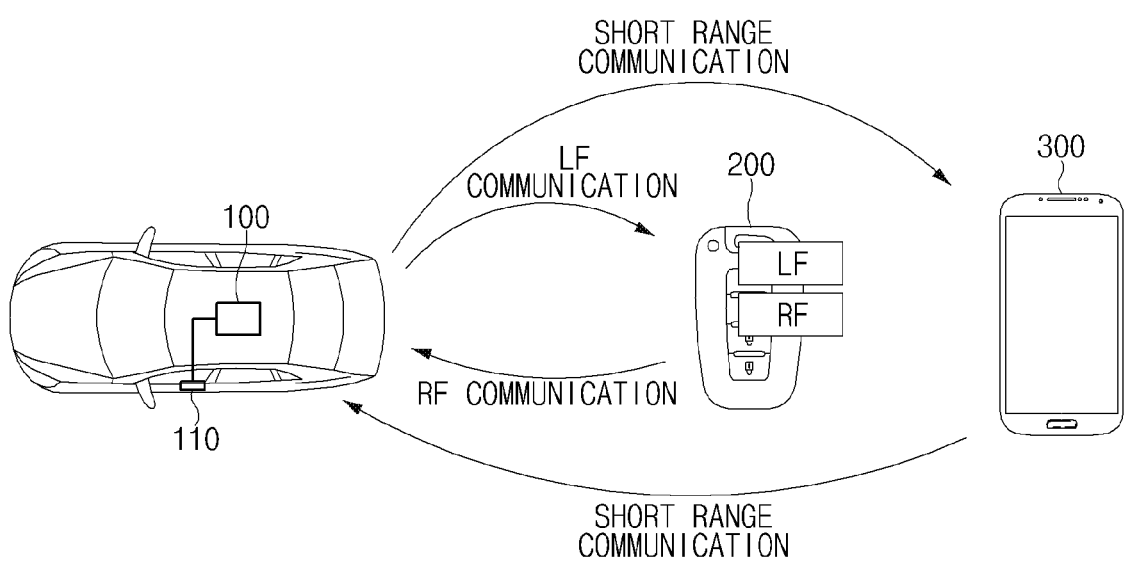
FIG. 2 is a diagram for describing a process of authenticating a user by a controller provided in a vehicle smart entry system in a first form of the present disclosure.

FIG. 2 is a diagram for describing a process of authenticating a user by a controller provided in a vehicle smart entry system according to a first form of the present disclosure.

As illustrated in FIG. 2, when a door handle button 110 of the vehicle is pressed (or touched) by the user, the controller 40 may activate the first communication device 20 and the second communication device 30. The activated first communication device 20 may communicate with the smart key 200, and the activated second communication device 30 may communicate with the smartphone 300.

The controller 40 may authenticate the smart key 200 (hereinafter, referred to as first authentication) based on the authentication information received through the first communication device 20, and authenticate the smartphone 300 (hereinafter, referred to as second authentication) based on the authentication information received through the second communication device 30. When the smart key and the smartphone are all normally authenticated, the controller 40 may allow the user to enter and exit the vehicle as well as to start the vehicle through an IBU (Integrated Body Unit) 400.

In this case, when the first authentication succeeds but the second authentication fails, the controller 40 may activate a Drive Video Record System (DVRS) through the IBU 400 and transmit a message (a warning message) informing the use of the vehicle to a vehicle owner's smartphone through a telematics module 500 because the user may be an acquaintance of the vehicle owner, or a person who is aiming to steal the vehicle. Here, the failure of the second authentication may include a case in which no authentication information has been received from the smartphone 300 at all.

Meanwhile, although the controller 40 has been described as being implemented in an integrated form as an example in the first form, the controller 40 may be implemented with separate two components, that is, an SMK controller that authenticates the smart key 200 based on the authentication information received through the first communication device 20 and an identity authentication unit (IAU) that authenticates the smartphone 300 based on the authentication information received through the second communication device 30.

Second Form

The following second form shows a case in which a short-range communication module 210 is mounted on the smart key 200. As an example, Bluetooth (BLE) will be described as an example.

The first communication device 20 may be activated by the controller 40 to communicate with the smart key 200. That is, the first communication device 20 may insert a time stamp into a low frequency (LF) frame requesting authentication information, transmit the LF frame to the smart key 200, and then receive the authentication information from the smart key 200 in a radio frequency (RF) communication method. In this case, the authentication information transmitted to the first communication device 20 by the smart key 200 may include a vehicle unique number, a time stamp value of the received LF frame, and the like.

The second communication device 30 may be activated by the controller 40 to communicate with the smart key 200 in a short-range communication method. That is, the second communication device 30 may insert a time stamp into a frame requesting authentication information, transmit the frame to the smart key 200 and receive the authentication information from the smart key 200. In this case, the authentication information transmitted to the second communication device 30 by the smart key 200 may include a vehicle unique number and a time stamp value of the received frame (hereinafter, referred to as a first time stamp value).

The second communication device 30 may be activated by the controller 40 to communicate with the smartphone 300 in a short range communication method. That is, the second communication device 30 may insert a time stamp into a frame requesting authentication information, transmit the frame to the smartphone 300, and receive the authentication information from the smartphone 300. In this case, the authentication information transmitted to the second communication device 30 by the smartphone 300 may include a smartphone unique number, a social security number of the user, a time stamp value of the received frame (hereinafter, referred to as a second time stamp value), and the like.

Here, a period at which the first communication device 20 communicates with the smart key 200 is identical to a period at which the second communication device 30 communicates with the smart key 200 and the smartphone 300. Accordingly, the time stamp value of the LF frame received from the first communication device 20 by the smart key 200, the time stamp value of the frame received from the second communication device 30 by the smart key 200, and the time stamp value of the frame received from the second communication device 30 are all identical to one another.

Hereinafter, operation of the controller 40 will be described with reference to FIG. 3.

Figure 3:
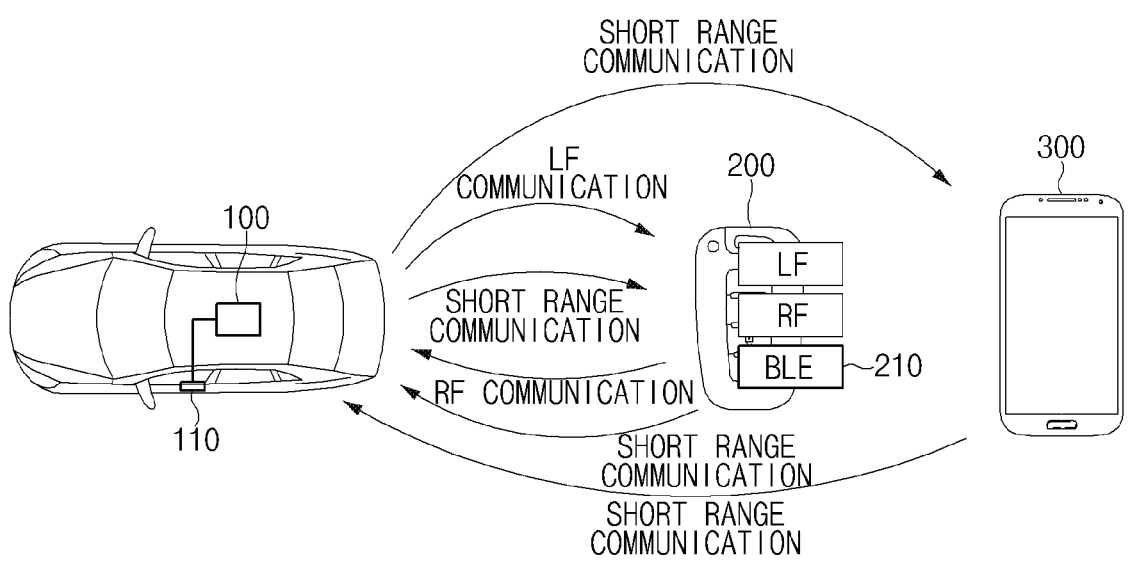
FIG. 3 is a diagram for describing a process of authenticating a user by a controller provided in a vehicle smart entry system in a second form of the present disclosure.

FIG. 3 is a diagram for describing a process of authenticating a user by a controller provided in a vehicle smart entry system according to a second form of the present disclosure, and the smart key 200 may be provided with the short-range communication module 210.

As illustrated in FIG. 3, when the door handle button 110 of the vehicle is pressed (or touched) by the user, the controller 40 may activate the first communication device 20 and the second communication device 30. The activated first communication device 20 may communicate with the smart key 200, and the activated second communication device 30 may communicate with the smart key 200 and the smartphone 300.

When the time stamp value received through the first communication device 20, and the first time stamp value (the time stamp value received from the smart key 200) and the second time stamp value (the time stamp value received from the smartphone 300) received through the second communication device 30 are all identical to one another, the controller 40 may allow the user to enter and exit the vehicle as well as to start the vehicle through the IBU (Integrated Body Unit) 400.

In this case, when the controller 40 fails to communicate with a pre-registered smartphone 300, that is, when the second timestamp value is not received from the pre-registered smartphone 300, the controller 40 may allow the user to enter and start the vehicle through the integrated body unit (IBU) 400 when the timestamp value received through the first communication device 20 is identical to the first timestamp value received through the second communication device 30.

In addition, when the timestamp value received through the first communication device 20 is not identical to the first timestamp value received through the second communication device 30, the controller 40 may determine a relay station attack (RSA) and activate the DVRS through the IBU 400, and transmit a message informing the RSA to the vehicle owner's smartphone through the telematics module 500. In this case, the controller 40 may not allow the user to enter or exit the vehicle.

Hereinafter, description will be given with respect to the ground to determine the relay station attack (RSA) with reference to FIG. 4.

Figure 4:
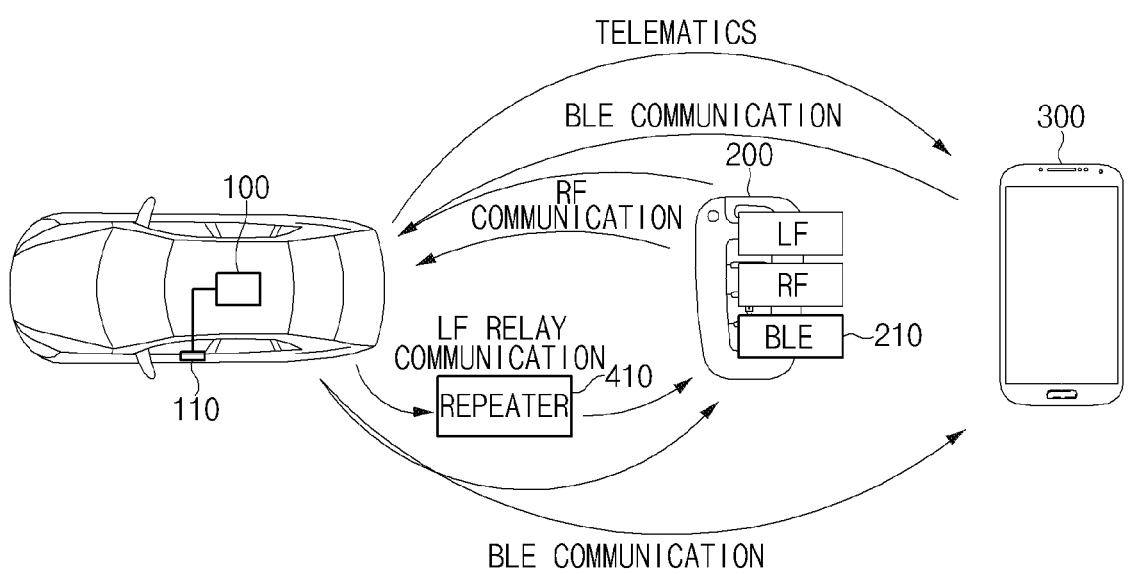
FIG. 4 is a diagram for describing a process of determining an a relay station attack (RSA) by a controller provided in a vehicle smart entry system in one form of the present disclosure.

FIG. 4 is a diagram for describing a process of determining an RSA by a controller provided in a vehicle smart entry system according to a second exemplary form of the present disclosure.

As illustrated in FIG. 4, an LF signal may be delayed and received by the smart key 200 because the RSA relays the LF signal transmitted from the first communication device 20 using a repeater 410. That is, a time stamp value of an LF frame received by the smart key 200 may be different from a time stamp value of a short-range communication frame received by the smart key 200.

As described above, when not passing through the repeater 410, the time stamp value of the LF frame received by the smart key 200 may be identical to the time stamp value of the short-range communication frame received by the smart key 200.

Figure 5:
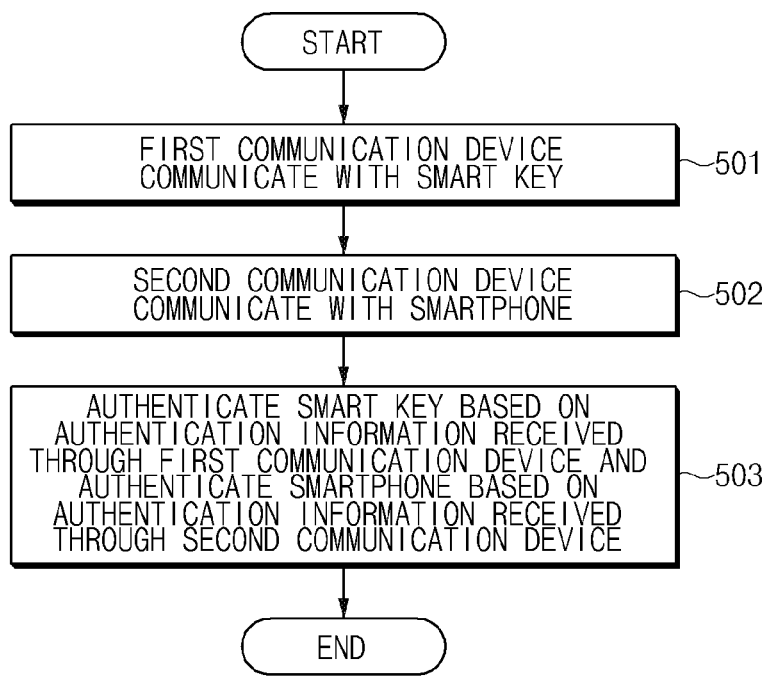
FIG. 5 is a flowchart of a method of operating a vehicle smart entry system in a one form of the present disclosure.

FIG. 5 is a flowchart of a method of operating a vehicle smart entry system according to a first form of the present disclosure.

First, the first communication device 20 may communicate with the smart key 200 (501).

Then, the second communication device 30 may communicate with the smartphone 300 (502).

Thereafter, the controller 40 may authenticate the smart key 200 based on the authentication information received through the first communication device 20, and authenticate the smartphone 300 based on the authentication information received through the second communication device 30. (503).

Figure 6:
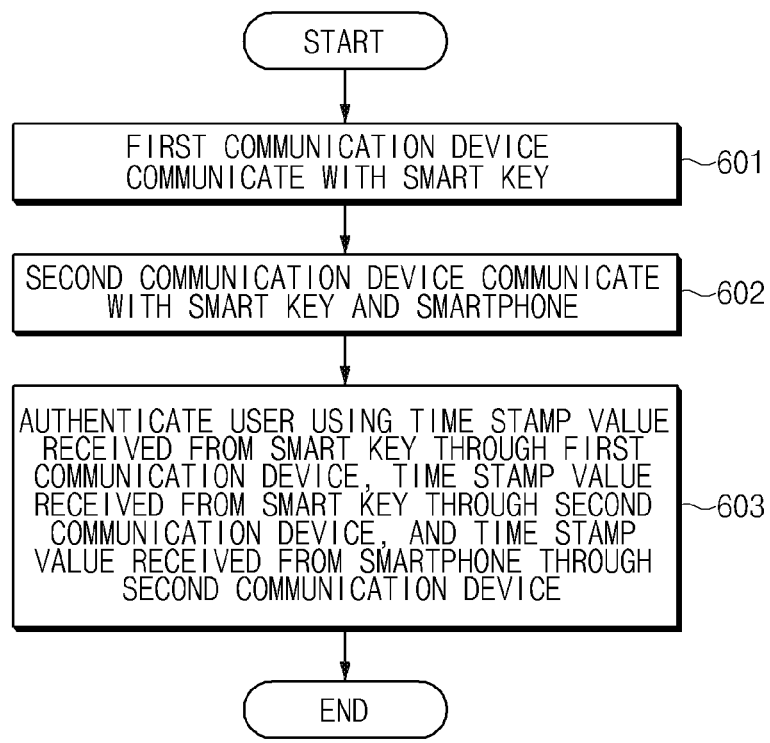
FIG. 6 is a flowchart of a method of operating a vehicle smart entry system in another form of the present disclosure.

FIG. 6 is a flowchart of a method of operating a smart entry system of a vehicle according to a second form of the present disclosure.

First, the first communication device 20 may communicate with the smart key 200 (601).

Then, the second communication device 30 may communicate with the smart key 200 and the smartphone 300 in a short-range communication method (602). In this case, a communication period of the first communication device 20 and a communication period of the second communication device 30 may be synchronized with each other.

Thereafter, the controller 40 may authenticate the user using the time stamp value received from the smart key 200 through the first communication device 20, the time stamp value received from the smart key 200 through the second communication device 30 and the time stamp value received from the smartphone 300 (603).

Figure 7:
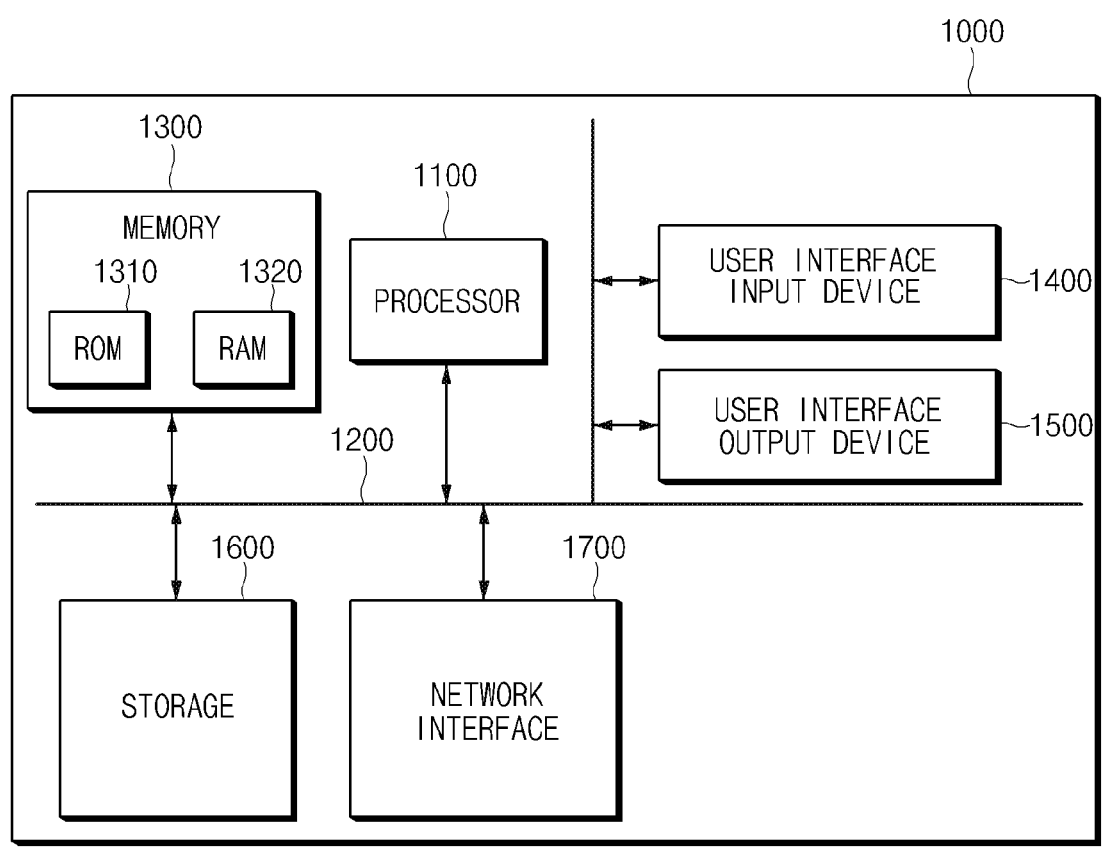
FIG. 7 is a block diagram illustrating a computing system for performing a method of operating a vehicle smart entry system in one form of the present disclosure.

FIG. 7 is a block diagram illustrating a computing system for executing a method of operating a smart entry system of a vehicle according to the present disclosure.

Referring to FIG. 7, the method of operating the smart entry system of the vehicle according to the present disclosure described above may be implemented through a computing system. A computing system 1000 may include at least one processor 1100, a memory 1300, a user interface input device 1400, a user interface output device 1500, storage 1600, and a network interface 1700, which are connected with each other via a system bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the forms disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a solid state drive (SSD), a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary forms of the present disclosure are provided to explain the spirit and scope of the present disclosure, but not to limit them, so that the spirit and scope of the present disclosure is not limited by the forms. The scope of the present disclosure should be construed on the basis of the accompanying claims, and all the technical ideas within the scope equivalent to the claims should be included in the scope of the present disclosure.

According to the vehicle smart entry system and the method of operating the same according to the forms of the present disclosure, it is possible to improve the security by authenticating not only the smart key but also the smart phone of a user attempting to ride in the vehicle.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A vehicle smart entry system comprising:
   a first communication device configured to communicate with a smart key;
   a second communication device configured to communicate with the smart key and a smartphone;
   a controller configured to authenticate a user using a first time stamp value received from the smart key through the first communication device, and a second time stamp value received from the smart key through the second communication device and a third time stamp value received from the smartphone through the second communication device.

2. The vehicle smart entry system of claim 1, wherein a period at which the first communication device communicates with the smart key is identical to a period at which the second communication device communicates with the smart key and the smartphone.

3. The vehicle smart entry system of claim 2, wherein the first communication device is configured to:
   insert a time stamp into a Low Frequency (LF) frame,
   transmit the LF frame to the smart key, and
   receive a time stamp value of the LF frame received from the smart key.

4. The vehicle smart entry system of claim 3, wherein the second communication device is configured to:
   insert a time stamp into a short-range communication frame,
   transmit the short-range communication frame to the smart key and the smartphone,
   receive a time stamp value of the short-range communication frame received from the smart key, and
   receive the time stamp value of the short-range communication frame received from the smartphone.

5. The vehicle smart entry system of claim 4, wherein the controller is configured to authenticate the user as normal when the first time stamp value received through the first communication device, the second time stamp value received from the smart key through the second communication device, and the third time stamp value received from the smartphone through the second communication device are identical to one another.

6. The vehicle smart entry system of claim 4, wherein the controller is configured to authenticate the user as normal when the first time stamp value received through the first communication device and the second time stamp value received from the smart key through the second communication device are identical to each other.

7. The vehicle smart entry system of claim 4, wherein the controller is configured to activate a Drive Video Record System (DVRS) and transmit a warning message to a smartphone of an owner of a vehicle when the first time stamp value received through the first communication device and the second time stamp value received from the smart key through the second communication device are not identical to each other.

8. A method of operating a vehicle smart entry system comprising:
   communicating, by a first communication device, with a smart key;
   communicating, by a second communication device, with the smart key and a smartphone; and
   authenticating, by a controller, a user based on a first time stamp value received from the smart key through the first communication device, a second time stamp value received from the smart key through the second communication device, and a third time stamp value received from the smartphone through the second communication device.

9. The method of claim 8, wherein a period at which the first communication device communicates with the smart key is identical to a period at which the second communication device communicates with the smart key and the smartphone.

10. The method of claim 9, wherein communicating, by the first communication device, with the smart key includes:
    inserting a time stamp into a Low Frequency (LF) frame and transmitting the LF frame to the smart key; and
    receiving a time stamp value of the LF frame received from the smart key.

11. The method of claim 10, wherein communicating, by the second communication device, with the smart key and the smartphone includes:

inserting a time stamp into a short-range communication frame and transmitting the short-range communication frame to the smart key and the smartphone;
receiving a time stamp value of the short-range communication frame received from the smart key; and
receiving the time stamp value of the short-range communication frame received from the smartphone.

12. The method of claim 11, wherein authenticating the user includes: authenticating the user as normal when the first time stamp value received through the first communication device, the second time stamp value received from the smart key through the second communication device, and the third time stamp value received from the smartphone through the second communication device are identical to one another.

13. The method of claim 11, wherein authenticating the user includes: authenticating the user as normal when the first time stamp value received through the first communication device and the second time stamp value received from the smart key through the second communication device are identical to each other.

14. The method of claim 11, wherein authenticating the user includes: activating a Drive Video Record System (DVRS) and transmitting a warning message to a smartphone of an owner of a vehicle when the first time stamp value received through the first communication device, and the second time stamp value received from the smart key through the second communication device are not identical to each other.

* * * * *